United States Patent [19]

Matejka et al.

[11] Patent Number: 4,664,810

[45] Date of Patent: May 12, 1987

[54] METHOD OF SEPARATING HEAVY METALS FROM COMPLEX-FORMING SUBSTANCES OF AMINOCARBOXYLIC ACID TYPE, OR SALTS THEREOF IN AQUEOUS SOLUTIONS

[75] Inventors: Zdenek Matejka; Jarcslay Eliasek, both of Prague, Czechoslovakia

[73] Assignee: Vysoka skola chemicko-technologicka, Prague, Czechoslovakia

[21] Appl. No.: 739,127

[22] Filed: May 30, 1985

[30] Foreign Application Priority Data

Jun. 1, 1984 [CS] Czechoslovakia ............... 4133-84

[51] Int. Cl.$^4$ ............................................. C02F 1/42
[52] U.S. Cl. .................................. 210/672; 210/684; 210/688
[58] Field of Search .................. 204/180 R, 180 B; 210/670, 672, 677, 684, 688, 912-914

[56] References Cited

U.S. PATENT DOCUMENTS

| | | | |
|---|---|---|---|
| 2,954,276 | 9/1960 | Hazen | 210/684 |
| 2,980,607 | 4/1961 | Mock et al. | 210/684 |
| 3,003,866 | 10/1961 | Mattano et al. | 210/684 |
| 3,148,947 | 9/1964 | Fleischmann | 210/684 |
| 3,528,912 | 9/1970 | Popper et al. | 210/677 |
| 3,725,259 | 4/1973 | Depree | 210/684 |
| 4,152,493 | 5/1979 | Yotsumoto et al. | 210/688 |
| 4,303,704 | 12/1981 | Courduvelis et al. | 210/670 |
| 4,332,916 | 6/1982 | Thill | 210/688 |
| 4,537,937 | 8/1985 | Cawlfield et al. | 210/688 |

*Primary Examiner*—Ivars Cintins

[57] ABSTRACT

Method of separating heavy metals from complex-forming substance of aminocarboxylic acid type, or salts thereof in aqueous solutions, as well as a method of removing heavy metals from the solutions containing said complex-forming substance. A solution containing heavy metals in complex form and complex-forming substances of aminocarboxylic acid type is contacted with a ion exchanger having polyethyleneimine active groups, whereupon free non-complexed heavy metal cations are displaced out of said ion exchanger by an acid solution of 0.5-30 percent concentration, and the ion exchanger is converted back into its active form by a solution of an alkali hydroxide, carbonate, or hydrogen carbonate of 0.5-30 percent concentration. The method is applicable in the treatment of waste water from electroless copper plating processes in the electronic industry, also for the removal of heavy metals in complex form from solutions left after ore leaching in the hydrometallurgical industry, and for purifying decontamination solutions in nuclear power stations.

7 Claims, No Drawings

METHOD OF SEPARATING HEAVY METALS FROM COMPLEX-FORMING SUBSTANCES OF AMINOCARBOXYLIC ACID TYPE, OR SALTS THEREOF IN AQUEOUS SOLUTIONS

The invention relates to a method of separating heavy metals from complex-forming substances of aminocarboxylic acid type, or salts thereof in aqueous solution, as well as a method of removing heavy metals from the solutions containing said complex-forming substances.

Solutions containing heavy metals in complex form and substancs of aminocarboxylic acid type, or salts thereof, are used and occur in metal finishing processes, galvanotechniques, preferably in the electroless copper coating process, further in hydrometallurgy and in decontaminating solutions in nuclear power stations. As complex-forming substances there are used for this purpose nitrilotriacetic acid, hydroxyethylenediaminotriacetic acid (HEDTA) and ethylenediaminotetracetic acid (EDTA), or sodium salts thereof. A relatively strong complex bond between heavy metals and such complex-forming substances, however, makes the effective removal of heavy metals very difficult.

For removing chelated heavy metals from solutions there have been recently developed various precipitation processes based either on a previous displacement of a heavy metal out of the complex as e.g. by $Ca^{2+}$, or by reductants ($Fe^{2+}$; borohydride); alternatively, the formation of poorly soluble compounds such as precipitation of sulphides or xanthates has been availed of. A common disadvantage of all of the aforementioned processes consists in that residual heavy metal concentrations in treated water do not always meet the water system requirements; further, in a relatively low reaction rate of precipitation, with a poor sedimentation of the precipitate, the necessity of using a relatively considerable excess of chemicals and precipitants (which remain in the treated water), results in a hygienic defectiveness in case of using sulphides and derivatives thereof; and finally, in that in all of the cases there arise large amounts of sludge, making the recovery of metals from them very difficult.

For separating heavy metals from complex-forming substances and for removing them from solutions there has been developed and patented a process (U.S. Pat. No. 4,303,704) based on the utilization of the ion exchanger having an iminodiacetate active group. This, as well as other ion-exchange base processes (C. Courduvelis et al: "New Developments for the Treatment of Wastewater containing Metal complexers" referred to at the 4th Conference about Advanced Pollution Control for the Metal Finishing Industry; EPA, 1982; R. Naujocks: Abwasserbehandlungalsals Dienstleistung, Galvanotechnik, 74/1983, 12, 3–6; J. V. Peck and R. M. Spearot: "Copper Removal from Metal Finishing Waste Solutions" referred to at the 70th annual technical conference of the American Electroplaters Society, Indianopolis, 1983) are, however, ineffective in the presence of ethylenediaminotetracetic acid (EDTA), or other chelating substances of aminocarboxylic acid type, or salts thereof.

It is an object of the present invention to eliminate the disadvantages of the prior art as hereinabove set forth, and to provide an improved method of separating heavy metals from complex-forming substances in aqueous solutions by means of a chelate ion exchanger. In accordance with the invention, an anion exchanger having polyethyleneimine active groups is contacted, most preferably dynamically in a column, with a solution containing heavy metals in complex form and complex-forming substances. Recaptured heavy metals are then displaced out of the ion exchanger, which is already in the form of free non-complex cations, by an acid solution which is allowed to pass through the column containing the chelating ion exchanger.

Other features of the invention will appear from the following description and from the appended claims.

An advantage of the process according to the invention consists in that the polyethyleneimine active groups of the ion exchanger exhibit as high an affinity to heavy metals as being capable of splitting a bond between the heavy metal and the chelate substance in a solution, so that free heavy metal cations get into the ion exchanger phase where they are taken up by bonds to the imine groups of the ion exchanger. However, a positive charge of such very firmly bound heavy metal cations has to be compensated for—in order to keep the condition of electronneutrality—by a negative charge of anions which are present in the solution. These anions are bound to the ion exchanger by electrostatic attraction forces and, consequently, they are freely exchangable for any other anions which are present in the solution. This is why in the presence of EDTA in the solutions, the complex forming substance is electrostatically taken up by the resin in a molar ratio of 1:2 (i.e. EDTA:-heavy metal cations bound by the coordinating bond).

It has been now ascertained that the effectiveness of sorption of free heavy metal cations by a ion exchanger having polyethyleneimine active groups from a solution containing heavy metals in complex form and complex-forming substances, can be significantly enhanced by adding $Mg^{2+}$ or $Ca^{2+}$ to the solution to be treated.

Further it has been found that a selective displacement of electrostatically bound EDTA anions can be effected, for instance, by $MgSO_4$ solution while heavy metals remain firmly bound by the ion exchanger. If the sorption takes place at a relatively high pH value, or without adding $Mg^{2+}$ or $Ca^{2+}$ to the treated solution, then the recaptured EDTA amount is low and it is unnecessary to carry out the selective displacement of the electrostatically bound EDTA anion.

The method of the invention makes it possible to separate heavy metals from chelating substances, and to recover heavy metals in such concentrations that facilitate the reuse thereof so that in waste water treatment the arising of any toxic waste is prevented.

The following examples are given as illustrative only without, however, limiting in any way the scope of the invention.

EXAMPLE 1

By diluting a electroless copper coating bath there was prepared a model rinsing liquor containing 31.5 mg of copper per liter (0.5 mmol/liter) and 0.55 mmol/liter of EDTA, and having a pH value of 8.9. The liquor was allowed to pass at the speed of 150 ml p.h. through a column (15 mm internal diameter) containing 30 ml of a ion exchanger containing a polyethyleneimine active group. In the course of the sorption phase, individual fractions of the filtrate were analyzed and it was found out that the residual copper concentration was lower than 0.1 mg/liter up to the processing of 36 column volumes, which constitutes the break through capacity of 0.036 mol/liter (related to monovalent cations). A quantitative displacement of recaptured copper was effected by 120 ml of 1.5M H₂SO₄ at the flow rate of 60 ml per hour. The regeneration eluate was then alkalized to a pH value of from 10 to 11, and after sedimenting a precipitated copper hydroxide, the 0.8 mg/liter copper concentration in the supernatant solution was determined.

EXAMPLE 2

There was prepared a model waste water containing 3 mmol/liter of EDTA, 2 mmol/liter of copper and 3 mmol/liter of magnesium, the pH value having been buffered to 4.9. The solution was allowed to pass at the speed of 150 ml per hour through a glass column (15 mm int. dia) containing 30 ml of ionex with a polyethyleneimine active group. Before the residual copper concentration in the filtrate had grown up to more than 0.1 mg/liter, 120 column volumes were processed, which constituted the useful capacity of 0.48 mol/liter (related to monovalent cations). After the sorption phase had ended, an EDTA portion bound to the ion exchanger was first displaced by 90 ml of 1.5M H₂SO₄ solution, and after a short washing by water, copper was displaced by another 120 ml of 1.5M H₂SO₄. For comparing the sorption effectiveness, there was also used for the treatment of this solution an ionex having an iminodiacetate active group (commercial product LEWATIT TP 207). However, even in the initial filtrate portions after the beginning of the sorption phase, there was not achieved in this case a lower than 5 mg/liter residual copper concentration, and this value further exhibited a steep rise.

The method provided by the present invention is applicable in the treatment of waste water left after currentless copper coating processes in the electronic industry, further for separating heavy metals in complex form from solutions left after ore leaching in the metallurgical industry, and for purifying decontamination solutions in nuclear power stations.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A method of separating heavy metals from complex-forming substances selected from the group consisting of NTA, HEDTA, EDTA, DTPA, and salts thereof in aqueous solutions, the method comprising contacting the solution of heavy metals in complex form and complex forming substances selected from the group consisting of NTA, HEDTA, EDTA, DTPA, or salts thereof with an ion exchanger having polyethyleneimine active groups, subsequently displacing non-chelated cations of heavy metals out of said ion exchanger by treating the said ion exchanger with an aqueous solution of a water soluble mineral acid having a concentration within the range of about 0.5% by weight, to about 30%, by weight, thereby forming an eluate and then converting the said ion exchanger back into its active form by treating the said ion exchanger with an aqueous solution of at least one of the group consisting of alkali hydroxide, alkali carbonate or an alkali hydrogen carbonate, or a mixture thereof, having a total concentration of said alkali hydroxide, alkali carbonate or alkali hydrogen carbonate within the range of about 0.5%, by weight, to 30%, by weight.

2. A method as claimed in claim 1, wherein heavy metals are precipitated from the eluate, by an agent chosen from the group consisting of sodium carbonate, potassium carbonate, sodium hydroxide, and the heavy metals are then filtered off, and reused in another run of the separating method.

3. A method as claimed in claim 1, wherein heavy metals are separated electrolytically from the eluate, and the heavy metals are then filtered off, and reused in another run of the separating method.

4. A method as claimed in claim 1, wherein before displacing non-chelated cations of heavy metals out of the ion exchanger having polyethyleneimine active groups by treating the ion exchanger with an aqueous solution of a water soluble mineral acid having a concentration within the range of about 0.5%, by weight, to about 30%, by weight, there is effected a selective displacement of the complex forming substances selected from the group consisting of NTA, HEDTA, EDTA, DTPA or salts thereof out of said ion exchanger by treating the said ion exchanger with an aqueous solution of at least one of the group consisting of a chloride, sulphate or nitrate, a mixture thereof in the form of a potassium salt or sodium salt or calcium salt or magnesium salt, or a mixture thereof, having a total concentration of said chloride sulphate or nitrate within the range of about 0.01M to about 10.0M.

5. A method as claimed in claim 4 wherein the complex forming substances, selectively displaced out of said ion exchanger into the eluate, are precipitated by treating this eluate with an aqueous solution of a mineral acid, and the complex forming substances are then filtered off, and reused in another run of the separating method.

6. A method as claimed in claim 5, wherein after precipitating the complex-forming substances from the eluate by addition of the acid, the eluate is neutralized by addition of calcium or magnesium oxide and is reused for the selective displacement of complex-forming substances out of the ion exchanger.

7. A method as claimed in claim 1, wherein to a solution containing heavy metals in complex form and complex-forming substances selected from the group consisting of NTA, HEDTA, EDTA, DTPA, or salts thereof, prior to contacting said solution with the ion exchanger having polyethyleneimine active groups, there are added at least one of the group consisting of magnesium or calcium cations, or a mixture thereof, in the form of chloride or sulfate or nitrate or hydrogencarbonate or oxide, or a mixture thereof, having a total concentration of said magnesium or calcium cations within the range of about 0.0001M to about 0.1M.

* * * * *

UNITED STATES PATENT AND TRADEMARK OFFICE
CERTIFICATE OF CORRECTION

PATENT NO. : 4,664,810
DATED : May 12, 1987
INVENTOR(S) : Zdenek MATEJKA et al

It is certified that error appears in the above-identified patent and that said Letters Patent are hereby corrected as shown below:

On the Title Page, the second inventor's name should read

-- Jaroslav ELIASEK --.

Signed and Sealed this

Fifteenth Day of September, 1987

Attest:

DONALD J. QUIGG

*Attesting Officer*  *Commissioner of Patents and Trademarks*